(12) United States Patent
Roche

(10) Patent No.: US 8,298,501 B2
(45) Date of Patent: Oct. 30, 2012

(54) PROCESS FOR FORMING HIGH DENSITY SULFIDES

(75) Inventor: Eric Girvan Roche, Booragul (AU)

(73) Assignee: BHP Billiton SSM Development Pty Ltd., Perth, Western Australia (AU)

( * ) Notice: Subject to any disclaimer, the term of this patent is extended or adjusted under 35 U.S.C. 154(b) by 39 days.

(21) Appl. No.: 13/000,467

(22) PCT Filed: Jun. 26, 2009

(86) PCT No.: PCT/AU2009/000813
§ 371 (c)(1),
(2), (4) Date: Feb. 8, 2011

(87) PCT Pub. No.: WO2009/155652
PCT Pub. Date: Dec. 30, 2009

(65) Prior Publication Data
US 2011/0123418 A1    May 26, 2011

(30) Foreign Application Priority Data
Jun. 27, 2008  (AU) .............................. 2008903298

(51) Int. Cl.
*C01B 17/20* (2006.01)

(52) U.S. Cl. ..................................... 423/140; 423/561.1
(58) Field of Classification Search .................. 423/140, 423/561.1
See application file for complete search history.

(56) References Cited

U.S. PATENT DOCUMENTS

| | | | |
|---|---|---|---|
| 4,110,400 | A | 8/1978 | Jha et al. |
| 4,547,347 | A | 10/1985 | Lussiez et al. |
| 6,391,089 | B1 | 5/2002 | Curlook |
| 2006/0169104 | A1 | 8/2006 | Chamberlain et al. |
| 2006/0228279 | A1* | 10/2006 | Campbell et al. .......... 423/150.1 |

FOREIGN PATENT DOCUMENTS

| | | |
|---|---|---|
| WO | WO 2004/090176 | 10/2004 |
| WO | WO 2008/003160 | 1/2008 |

* cited by examiner

*Primary Examiner* — Timothy Vanoy
(74) *Attorney, Agent, or Firm* — Brinks Hofer Gilson & Lione; G. Peter Nichols

(57) ABSTRACT

A process for the recovery of a metal sulfide from a metal ion containing solution, including the steps of: a) providing a slurry containing seed particles of said metal sulfide; b) adding a sulfide ion containing solution to said slurry to form an activated seed slurry; c) mixing said activated seed slurry with said metal ion containing solution to thereby form a metal sulfide precipitate; and d) recovering said metal sulfide precipitate.

19 Claims, 3 Drawing Sheets

PROCESS FOR FORMING HIGH DENSITY SULFIDES

This application claims priority to PCT Application Ser. No. PCT/AU2009/000813 filed Jun. 26, 2009 published in English on Dec. 30, 2009 as PCT WO 2009/155652; and to Australian Application No. 2008903298 filed Jun. 27, 2008, the entire contents of each are incorporated herein by reference.

FIELD OF THE INVENTION

The present invention relates to a process for forming a metal sulfide precipitate with improved handling characteristics and bulk solids loading from a metal containing solution. The invention is particularly concerned with a process for reducing slimes formation during the recovery of metal values from a pregnant leach solution.

BACKGROUND TO THE INVENTION

The hydrometallurgical processing of metal value containing ores or concentrates, typically comprises leaching with either an acidic or alkaline solution to produce a pregnant leach solution, from which the metal values are extracted. Depending on the chemical nature of the metal values, one means of recovering them from solution is by precipitation as metal sulfides. Examples of metals that can be recovered by precipitation as metal sulfides include nickel, cobalt, zinc, copper, gold, silver, iron, gallium, germanium, arsenic, cadmium, indium, tin, antimony, platinum, palladium, mercury, thallium, lead and bismuth.

However, sulfide precipitation as a recovery mechanism can be problematic where the metal sulfides are prone to slimes formation. Slimes refers to the precipitation of very fine particles of metal sulfides (typically, less than 0.0635 mm in diameter, or less than mesh number 200) which can be very difficult to separate from solution by conventional means such as by using thickeners, filters or counter current decantation. In the case of thickeners this is due to the difficulty in achieving adequate settling density of the very fine particles, and also the desire to avoid carryover of particles into the overflow, whereas in the case of filters the fine particles can "blind" the filtration media, or pass completely through it.

There is accordingly a need for a process for increasing the density of metal sulfides from a product leach solution, which thereby minimises the formation of slimes.

References to prior art in this specification are provided for illustrative purposes only and are not to be taken as an admission that such prior art is part of the common general knowledge in Australia or elsewhere.

DESCRIPTION OF THE INVENTION

According to the present invention, there is provided a process for the recovery of a metal sulfide from a metal ion containing solution, including the steps of:
 a) providing a slurry containing seed particles of said metal sulfide;
 b) adding a sulfide ion containing solution to the said slurry to form an activated seed slurry;
 c) mixing said activated seed slurry with said metal ion containing solution to thereby form a metal sulfide precipitate; and
 d) recovering said metal sulfide precipitate.

Preferably, at least part of said metal sulfide precipitate recovered in step (d) is recycled for use as said seed particles in step (a).

The sulfide ion containing solution may include hydrosulfide ions, sulfide ions or polysulfide ions. In particular, the sulfide ion containing solution may include a soluble sulfide selected from $NaSH$, $NH_4SH$, $Ca(SH)_2$ $Mg(SH)_2$, $Na_2S$, $(NH_4)_2S$, $Na_2S_x$ and $(NH_4)_2S_x$, where x is in the range 2-5.

In an embodiment of the invention, the sulfide ion containing solution comprises a soluble sulfide solution formed by a reaction of $Ca(SH)_2$ and an exchange reagent, as described in Applicants co-pending patent application titled: "Process for Metal Recovery by Sulfide Precipitation", the entire disclosure of which is incorporated herein by reference.

The metal may be one or more of nickel, cobalt, zinc, copper, gold, silver, iron, gallium, germanium, arsenic, cadmium, indium, tin, antimony, platinum, palladium, mercury, thallium, lead or bismuth.

The process of the invention is particularly applicable to the extraction of nickel and/or cobalt. Preferably the metal ion containing solution of step (c) is a product liquor produced from the leaching of a nickel and/or cobalt containing material. The nickel and/or cobalt containing material is selected from lateritic, saprolitic, limonitic, partially oxidised or sulfide ores, concentrates or intermediate oxidic or sulfidic materials. Typically, the product liquor is produced from acid leaching of said nickel and/or cobalt containing material using one or more of: heap leaching, high pressure acid leaching, enhanced pressure acid leaching, atmospheric pressure acid leaching, oxidative NiS heap leaching, pressure leaching or tank leaching. However a suitable nickel and/or cobalt containing ammoniacal product liquor may also be produced for example from the Sherritt-Gordon ammonia/ammonium sulfate process.

The acid used in the acid leaching process of the invention may comprise sulfuric acid or hydrochloric acid. Preferably the acid is sulfuric acid.

The process of the invention particularly lends itself to heap leaching application where capital expenditure is being minimised. The process is preferably not used in conventional sulfide precipitation processes, where hydrogen sulfide gas is used as the source of sulfide. Such conventional processes require the use of autoclaves and are technically complex and expensive. Furthermore the step of activating the seed slurry by means of neutral hydrogen sulfide is thought to be less efficient due to the weak ability of $H_2S$ to coordinate as a ligand.

Where the metal ion containing solution is a product liquor from the leaching of a nickel and/or cobalt containing material, typically the metal sulfide precipitate contains NiS and/or CoS. More typically the metal sulfide precipitate is a mixed sulfide precipitate containing both NiS and CoS.

The seed particles of the metal sulfide typically have a particle size of greater than 1 micron. Preferably, the seed particles have a particle size of at least 5 microns, more preferably of at least 8 microns.

Without wishing to be limited to a particular reaction mechanism, it is believed that the addition of the sulfide ion containing solution to the seed particles of metal sulfide results in deposition of the sulfide containing ions onto the seed particles in the activated seed slurry. When the activated seed slurry is subsequently mixed with the metal ion containing solution, the metal ions react with the sulfide containing ions and precipitate as sulfides onto the surface of the seed particles. The seed particles accordingly grow coarser with continued sulfide precipitation onto their surfaces, resulting in a coarse particulate sulfide, instead of fine particulates being directly nucleated from the solution.

The process of the present invention enables sulfide precipitates to form having a significantly increased settling density as compared with sulfides precipitated as slime. For example, the invention can allow a settling density of greater than 5% w/w such as between 20% and 30% w/w as compared to metal sulfide slimes which may have a terminal settling solids loading of as little as about 4%. Moreover, the precipitate formed according to the process of the present invention, exhibits a low overflow of particulate solids to be achieved, when processed in a thickener.

BRIEF DESCRIPTION OF THE DRAWINGS

The invention will be better understood by reference to the accompanying drawings, in which.

DETAILED DESCRIPTION OF THE DRAWINGS

Figure 1:
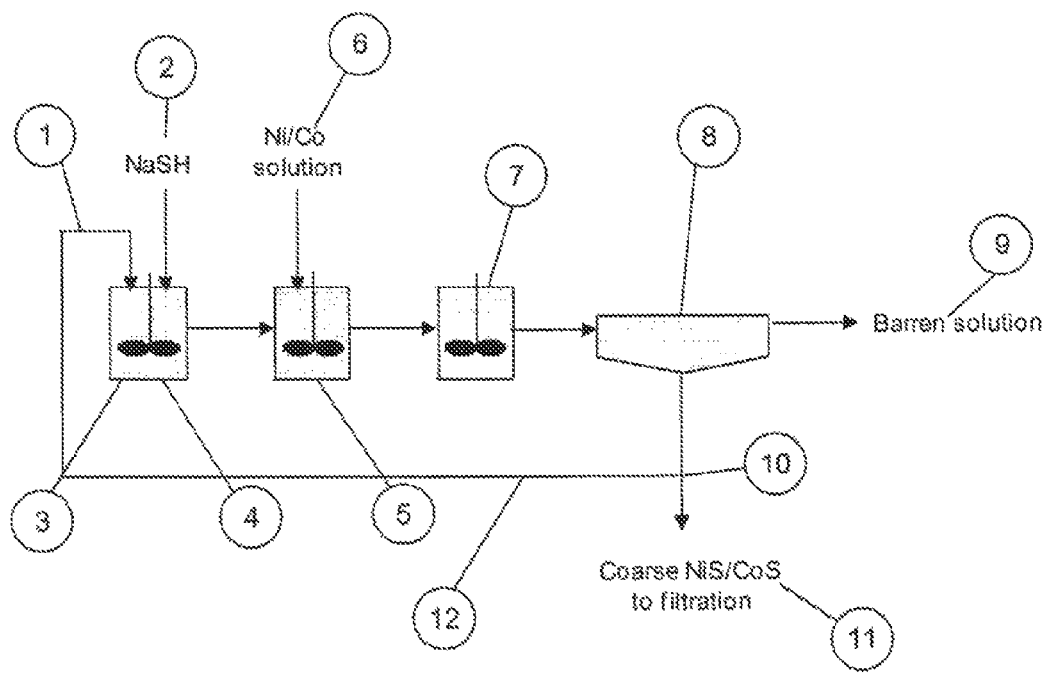
FIG. 1 is a flow-sheet showing an embodiment of the invention in which a nickel and cobalt containing pregnant leach solution is treated with an activated slurry solution.

FIG. 1 shows a non limiting flow-sheet in which one preferred embodiment of the process of the invention is outlined.

Seed particles of NiS (1) and/or CoS, having a particle size of greater than approximately 1 micron are added with a solution of NaSH (2) in a continuous stirred tank reactor (3). The mixture of seed slurry and NaSH solution is mixed together in order to form an activated seed slurry (4). The activated seed slurry (4) is believed to comprise the seed particles of nickel sulfide having hydrosulfide and/or sulfide ions deposited onto their surfaces.

The activated seed slurry (4) is then transferred to a second continuous stirred tank reactor (5) to which is added a cobalt and nickel containing product liquor (6) derived from the leaching of a nickel and cobalt containing material. The product liquor and activated seed slurry are mixed together in the second continuous stirred tank in order to form a mixed sulfide precipitate (MSP) containing slurry (7). The MSP slurry is then transferred to a third continuous stirred tank reactor if desired, to complete the reaction. The MSP slurry is then transferred to a thickener (8) in which the precipitated mixed sulfide particles of NiS and CoS are allowed to settle.

The barren solution (9) is allowed to overflow, and the mixed sulfide precipitate (11) removed from the bottom of the thickener (10) and then proceeds to a filtration step. A portion of the precipitate underflow containing underflow (12) is recycled for seed particles (1) to the first continuous stirred tank reactor (3).

Figure 2:
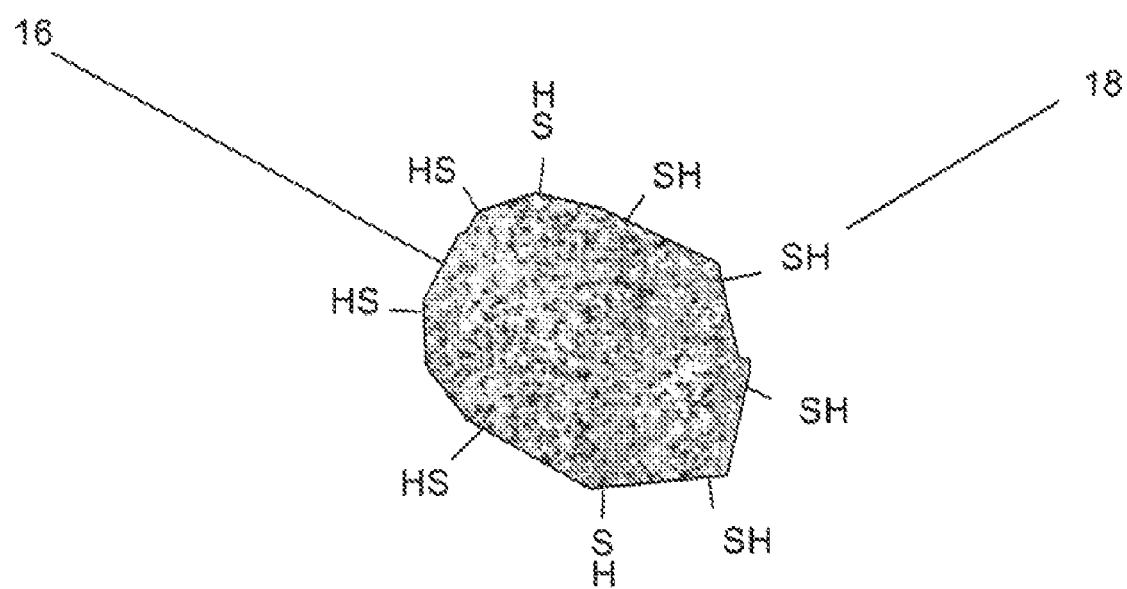
FIG. 2 is a schematic diagram of a metal sulfide seed particle on the surface of which is deposited hydrosulfide ions.

FIG. 2 shows a schematic diagram of the believed mechanism of formation of the activated seed slurry. FIG. 2 shows a nickel sulfide seed particle (16) after it has been mixed with the NaSH solution (2) whereby it is believed that SH⁻ ions (18) are attracted to and deposit on the surface of the seed particle (16), which together form an activated seed particle.

Upon exposure of activated seed particles to the nickel and cobalt containing product liquor (6) the nickel and cobalt ions react with the hydrosulfide ions on the surface of the seed particles and form a precipitate of NiS and CoS on the surface of the seed particles, thereby resulting in growth in the size of the seed particles. By this mechanism, it is believed that precipitation of the mixed sulfides as undesirably fine particles is thereby substantially avoided.

Figure 3:
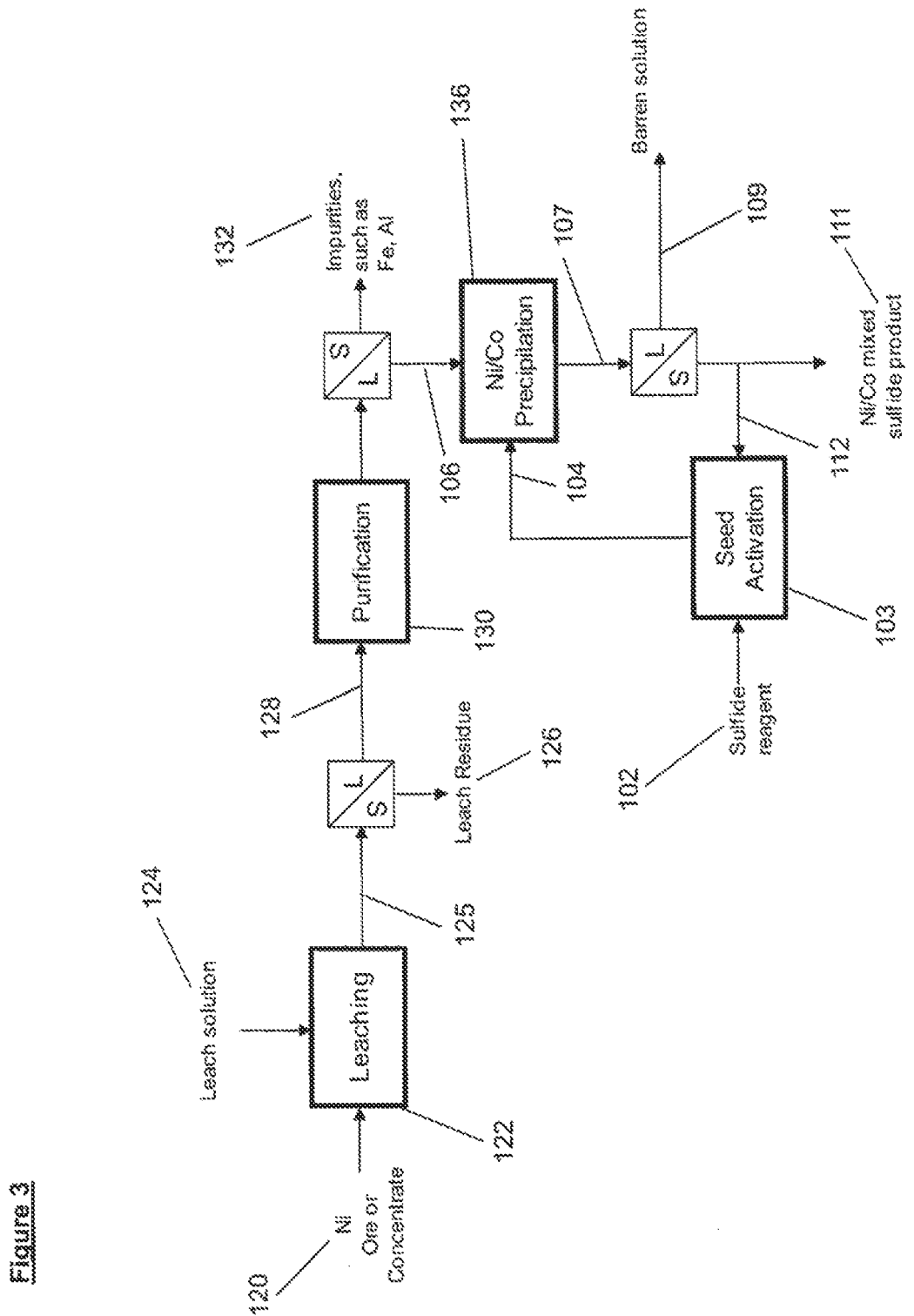
FIG. 3 is a flow-sheet showing an embodiment of the invention in which a nickel and cobalt containing pregnant leach solution is prepared by leaching a nickel containing ore or concentrate, and the nickel and cobalt recovered from solution by the process of the invention.

FIG. 3 shows a second non limiting flow-sheet in which a preferred embodiment of the process of the invention is incorporated into a process for leaching a Ni and/or Co ore or concentrate.

A nickel containing ore or concentrate (120) is subjected to a leaching process (122) with a suitable leaching solution (124). The leaching process (122) may be any appropriate leaching process, such as an acidic leach or an ammonia/ammonium sulfate leach. The resulting slurry (125) is subjected to a separation process to give a residue (126), which is discarded and a nickel and/or cobalt containing pregnant solution (128). The pregnant leach solution (128) is then treated in a purification stage (130) in order to precipitate and remove impurities (132) such as iron and aluminium.

After the separation of impurities (132) the nickel and/or cobalt containing product liquor (106) proceeds to a precipitation stage (136).

An activated seed slurry (104) is added to the purified nickel and cobalt containing product liquor (106) in the precipitation stage (136). The product liquor (106) and activated seed slurry (104) are mixed together to form a mixed sulfide precipitate slurry (107) having improved particle size than would be the case without addition of the activated seed slurry (104).

The Ni/Co mixed sulfide product (MSP) (111) is separated from the slurry (107) leaving a barren solution (109). A portion of the MSP (112) is transferred to a seed activation stage (103) to which is added a sulfide reagent (102) in order to form further activated seed slurry (104), which is recycled to the precipitation stage (136).

The invention described herein is susceptible to variations, modifications and/or additions other than those specifically described and it is to be understood that the invention includes all such variations, modifications and/or additions which fall within the spirit and scope of the above description.

The invention claimed is:

1. A process for the recovery of a metal sulfide from a metal ion containing solution, including the steps of:
    a) providing a slurry containing seed particles of said metal sulfide;
    b) adding a sulfide ion containing solution to said slurry to form an activated seed slurry where hydrogen sulfide gas is not the source of sulfide;
    c) mixing said activated seed slurry with said metal ion containing solution to thereby form a metal sulfide precipitate; and
    d) recovering said metal sulfide precipitate.

2. The process of claim 1, wherein at least part of said metal sulfide precipitate recovered in step (d) is recycled for use as said seed particles in step (a).

3. The process of claim 1, wherein said metal is one or more of Ni, Co, Zn, Cu, Au, Ag, Fe, Ga, Ge, As, Cd, In, Sn, Sb, Pt, Pd, Hg, Tl, Pb, Bi.

4. The process of claim 1, wherein said metal is nickel.

5. The process of claim 1, wherein the said metal is cobalt.

6. The process of claim 1, wherein said sulfide ion containing solution includes hydrosulfide ions, sulfide ions or polysulfide ions.

7. The process of claim 1, wherein said sulfide ion containing solution in step (b) includes a soluble sulfide selected from NaSH, $NH_4SH$, $Ca(SH)_2$, $Na_2S$, $(NH_4)_2S$, $Na_2S_x$ and $(NH_4)_2S_x$, where x is in the range 2-5.

8. The process of claim 1, wherein said metal ion containing solution is produced by acid leaching of a metal containing material selected from at least one of an ore, intermediate or concentrate.

9. The process of claim 1, wherein said metal ion containing solution of step (c) is a product liquor produced from the leaching of a nickel and/or cobalt containing material.

10. The process of claim 9, wherein said nickel and/or cobalt containing material is selected from lateritic, saprolitic, limonitic, partially oxidised or sulfide ores, concentrates or intermediate oxidic or sulfidic materials.

11. The process of claim 9, wherein said product liquor is produced from acid leaching of said nickel and/or cobalt containing material using one or more of: heap leaching, high pressure acid leaching, enhanced pressure acid leaching, atmospheric pressure acid leaching, oxidative NiS heap leaching, pressure leaching or tank leaching.

12. The process of claim 11, wherein the acid leaching includes the use of an acid selected from one of sulfuric acid or hydrochloric acid.

13. The process of claim 11, wherein said acid leaching is heap leaching.

14. The process of claim 11, wherein the metal sulfide precipitate includes one or more sulfides of Ni, Co, Zn, Cu, Au, Ag, Fe, Ga, Ge, As, Cd, In, Sn, Sb, Pt, Hg, Tl, Pb, Bi.

15. The process of claim 9, wherein said product liquor is produced from ammonia/ammonium sulfate leaching of said nickel and/or cobalt containing material using one or more of: heap leaching, high pressure acid leaching, enhanced pressure acid leaching, atmospheric pressure acid leaching, oxidative NiS heap leaching, pressure leaching or tank leaching.

16. The process of claim 1, wherein the metal sulfide precipitate is a mixed sulfide precipitate.

17. The process of claim 16, wherein the mixed sulfide precipitate includes NiS.

18. The process of claim 16, wherein the mixed sulfide precipitate includes CoS.

19. The process of claim 1, wherein said seed particles have a particle size of at least one micron.

* * * * *